July 13, 1937.  A. STOLL  2,087,053
ART OF MAKING NUTS
Filed Aug. 21, 1935   2 Sheets-Sheet 1
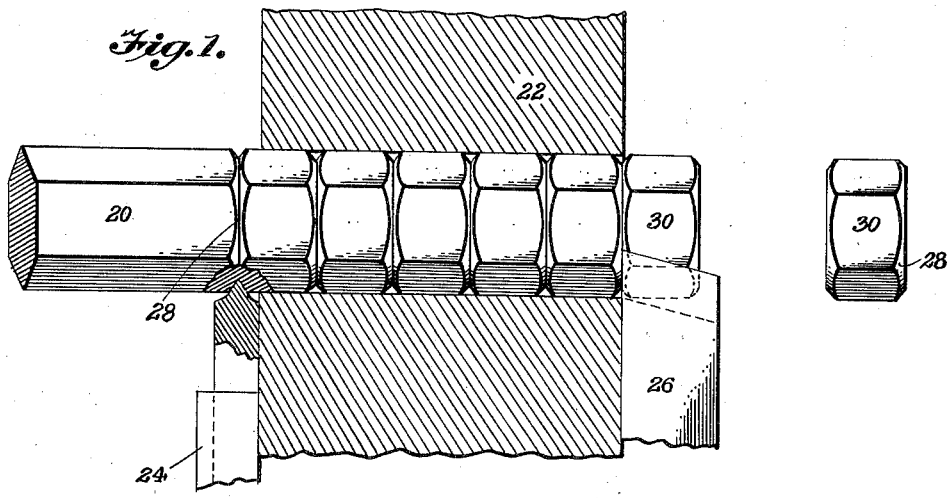
Fig. 1.
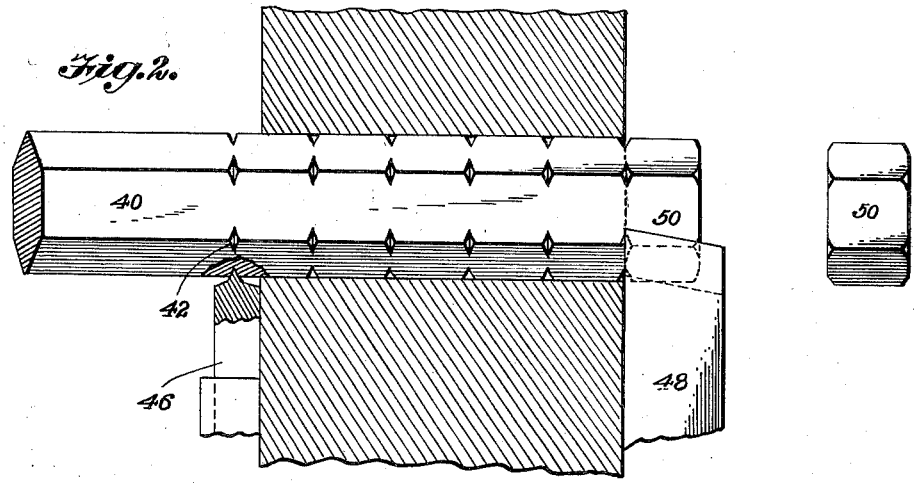
Fig. 2.
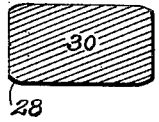  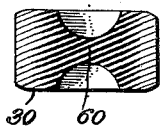  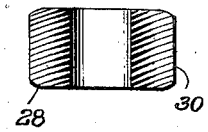  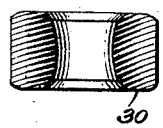  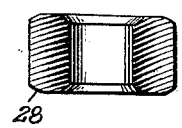
Fig. 3.   Fig. 4.   Fig. 5.   Fig. 6.   Fig. 7.
Inventor
ALBERT STOLL
By
Attorney July 13, 1937.　　　　　　　　A. STOLL　　　　　　　2,087,053
ART OF MAKING NUTS
Filed Aug. 21, 1935　　　　2 Sheets—Sheet 2
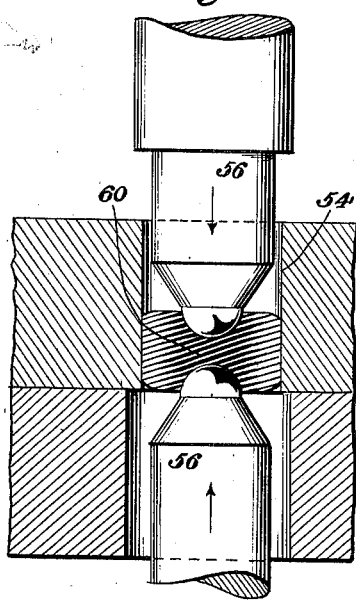
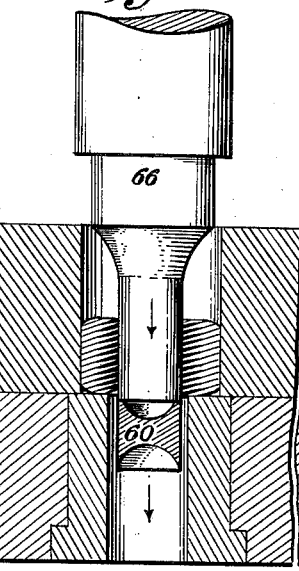
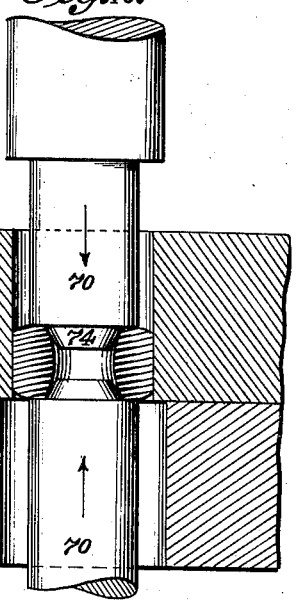
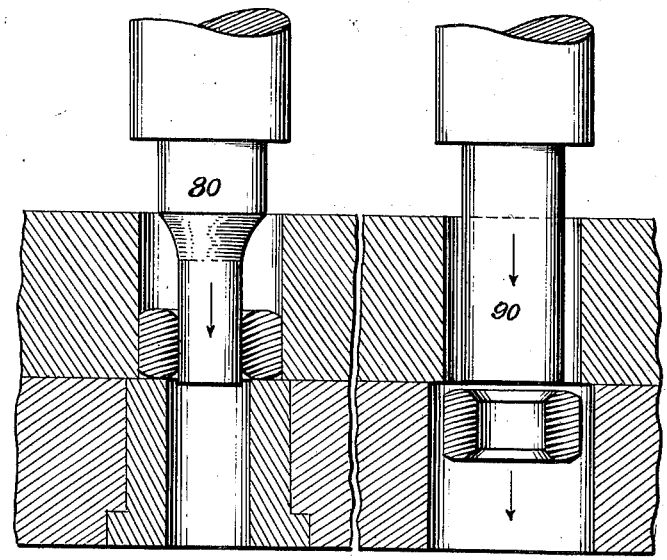
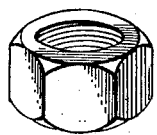
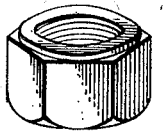
Inventor
ALBERT STOLL

UNITED STATES PATENT OFFICE 2,087,053

ART OF MAKING NUTS

Albert Stoll, Detroit, Mich., assignor to Clare L. Brackett, Detroit, Mich.

Application August 21, 1935, Serial No. 37,228

22 Claims. (Cl. 10—86)

This invention relates to nuts and to the production of nuts in a manner which contemplates a reduced cost of manufacture and in a fashion which adds to the tensile strength of the nut, particularly at the threaded portion thereof to better enable the nut to resist thread shearing strains incident to use.

Three radically different and major methods are practiced in the large scale production of nuts.

Under one method, the nuts are milled from hexagonal or other polygonal bars that are presented to the successive or possibly simultaneous action of chamfering, drilling and severing tools. Bar milled nuts are relatively expensive to produce. This is true for various reasons, fully appreciated by those in the industry. Among these reasons might be mentioned the large scrap loss in cuttings. Of course, this scrap loss varies with the size of the nuts being produced but, in general, it might be said to approximate 44 per cent of the bar stock. Further, there is to be considered the high cost of the cold drawn steel from which the nuts are milled and that cold drawn bars are of limited length, calling for repeated shut-downs of the nut producing equipment to re-stock the same with new bars. It will be seen that this involves an appreciable time loss and also results in the loss of the unusable ends of the bars, because, quite naturally, the feeding and holding collets for handling the bars must be allowed parts of the bars for gripping purposes. In addition, the cutting tools employed in the production of bar milled nuts are subjected to rapid wear, in consequence of which it is necessary to submit to repeated non-productive shut-downs for the replacement of the cutting tools and, of course, the adjustment of such tools is a matter requiring considerable mechanical skill, all of which adds to the cost of production. Finally, mention might be made of the fact that the various cutting and other operations necessary for the production of bar milled nuts are time consuming and thus have a limiting effect on the producing capacity of the machine in which the nuts are milled.

However, in the matter of appearance and accuracy of dimension, bar milled nuts excel as compared to nuts made by other methods. On the other hand, a bar milled nut lacks the strength where it is most needed. In explaining this, it is pointed out that the cold drawing of the bar from which nuts are milled, work hardens only the outside surface of the material, leaving the core or thread bearing portion thereof relatively soft and weak and unable to resist severe thread shearing strains incident to use. In other words, a bar milled nut lacks the thread strength that is so necessary to resist severe shearing strains because, obviously, the work hardening of the flats of the nut, as an incident to the former cold drawing process, in no manner benefits or enables the internal threads of the nut to resist shearing strains.

The second method widely used in the manufacture of nuts involves the cold punching of blanks from flat stock of a thickness approximating the height of the nut. This method has the advantages of rapid production and cheap tools. Nuts produced by this method involve a scrap loss of approximately 50 per cent and the nuts are inferior in quality as compared to nuts made by other widely practiced methods. Due to the severity of the punching operation, a low-grade material must be used and this is reflected by a lack of superior strength in the completed nut. Due to the depth of the piercing punch necessary for the formation of the bore in a nut of this type, the hole is a poorly finished one, resulting in inferior threads. In some cases, nuts made by this method are subjected to broaching, burnishing and facing operations in an effort to produce a nut comparing favorably with the bar milled product but due to the total lack of work hardening and the necessity of using a relatively soft material, the nut remains soft and consequently weak.

The third major method of producing nuts is by cold pressing and forming a nut from round wire. This method might be said to have its greatest advantage in a low scrap loss, averaging possibly 23 per cent, although this loss varies with the size of the nut being produced. The appearance of the nut is quite good but, on the other hand, due to the necessity of using a soft and ductile steel and consequently one of low work hardening characteristics, the threads of the finished nut are no stronger than those to be found in the bar milled product.

Also, a steel of sufficient ductility to respond to the severe deformations involved in the practice of this method, lacks the work hardening qualities so necessary in producing a nut of high tensile strength. In addition, a steel having the high ductility required for the practice of this method has poor thread cutting qualities and this, of course, is an item of major consideration. It might be added that due to the sequence of operations and to the necessity of deforming and expanding a round blank of wire to a polygonal form of greater diameter, the corners of the nuts are not sharply defined and are weak to the point where they offer little effective resistance to wrench pressures.

The high pressures required for the extreme material deformations involved in this widely practised process call for heavy and expensive machinery and this, of course, adds to the cost of the finished nut.

With an appreciation of the advantages and the disadvantages of the most widely practised methods for the large scale production of nuts, the invention forming the subject of this application will be found to look to an approach to the ideal in the provision of a nut formed from low cost material; one which may be produced with but relatively slight deformation of such material; one that compares favorably in appearance and accuracy with the bar milled product; one involving but a minor scrap loss; one that may be produced without the aid of heavy or relatively expensive equipment, and one in which the thread bearing portion thereof is possessed of ample strength to withstand strains which have a tendency to shear the threads, while leaving the surrounding and major portion of the nut substantially unaffected, all of which points to a reduced cost of manufacture and a relatively superior product.

More specifically, in accordance with this invention I provide for the formation of nut blanks from polygonal bars having approximately the same cross-sectional outline as that of the completed nuts to obviate the need of swaging the nut into a hexagonal or other required polygonal form and one of the important features of the invention has to do with the milling or cutting of chamfers around one or both terminals of the nut blanks as one of the first steps in manufacture, possibly coincident with the severing of the nut blanks from the bars or in preparation for this operation and then preserving these milled chamfers against the contrary influence of the swaging, punching and other succeeding operations, the production of these chamfers by cutting or milling being in contrast to the formation of chamfers by violent swaging operations which render the peripheral portion of the metal hard and brittle and consequently more susceptible to breakdown in use.

With the nut blanks thus formed with milled chamfers around one or more terminals thereof, the nut blanks are subjected to a plurality of succeeding and relatively mild but effective swaging operations to bring about the required minor redistribution of metal constituting the nuts and to work harden the material to the required point, while maintaining the said initially present milled chamfers.

For example, after the nut blank has been severed from the bar and with chamfers previously milled around one or both terminals thereof, the nut blank is placed in a die and is indented and extruded to a point where it has firm pressure contact with the side walls of the die and is thus centered for the succeeding operations, it being observed that since the nut blank was originally of hexagonal or other polygonal form, but slight extrusion of the metal is required to fill out the die, thereby avoiding the violent swaging that would be necessary to give the nut blank a hexagonal or other polygonal form as is required where a polygonal nut blank is formed from initially round stock.

As the description proceeds, it will be found that the indentation and extrusion of the nut blank is by the application of axial pressure to the central part of the nut blank, while leaving the surrounding part of the blank free for the axial flow and escape of the metal so that the principal work hardening of the material caused by such pressure is confined to the core of the blank or to that part of the blank which is later threaded and in this way the thread bearing portion of the nut has the hardness and tensile strength necessary to resist shearing strains.

In addition, it might be pointed out that such indentation and extrusion of the metal reduces the central part of the initially solid blank to a relatively thin web that is subsequently punched out to form the bore of the nut. Such reduction of the longitudinally central portion of the blank to a relatively thin web has the effect of simplifying the punching operation and, in addition, the loss of metal due to the removal of this web and the loss of material in the form of cuttings resulting from the milling of chamfers around one or both terminals of the nut constitute the only appreciable waste of material and these together aggregate but a negligible part of the material actually used in the nut.

Following the punching of the nut blank to produce the bore thereof, the nut blank may be subjected to a further and mild swaging operation to countersink it at one or both ends thereof and to give to the nut the required predetermined axial dimension, this operation in itself calling for but slight swaging of the material and leaving undisturbed the chamfers previously milled around one or both terminals of the nut blank.

As one of the final steps in the formation of the nut blank, the bore thereof is broached or shaved to remove the surplus metal which may have flowed inward under the previous swaging operations, and upon the completion of the broaching operation, the nut is ready for threading in any preferred manner.

It is recognized by those skilled in this art that a number of mild but effective swaging operations have less tendency to impair the integrity of metal than do one or two violent such operations which leads to the statement that I start with a bar having approximately the cross-sectional form of the completed nut and require only several mild but effective swaging and other shaping operations to produce the nut in the final form thereof. Since such operations are not in any sense violent, the integrity of the metal is left undefiled.

That is to say, the total deformation of metal necessary to produce a nut by the herein disclosed method is much less than by any other punching method of which I know and this is accomplished by a series of relatively mild swaging operations so that I am able to avoid detrimental distortion of the grain structure of the metal. Thus, the completed nut will have the toughness characteristic of a bar milled nut which, as previously stated, is more expensive to produce than a punched nut, while the principal work hardening of the material is confined to the thread bearing portion thereof.

Also, in the practise of the invention, the nature of the various swaging operations and the means to perform such operations allow full opportunity for the flow and escape of metal under die pressure so that there is less general work hardening of the material and the material is permitted a relatively easy response to tool pressures.

Another attribute of the invention will be found to reside in the fact that the several axial swaging pressures that are applied to the blank are confined to the longitudinally central portion of the metal thereby leaving undisturbed the peripheral chamfers and allowing the surrounding and vastly greater bulk of metal to remain possessed of its former toughness.

With further reference to the response of the metal to the various operations to which it is subjected, it is pointed out that the invention is adaptable for the use of hot rolled steel which, of course, is known to be materially tougher and more ductile than cold rolled steel, with the result that such steel is readily workable by cutting, swaging and punching tools and the completed nut will have the toughness and tenacity known to be characteristic of hot rolled steel while at the same time hot rolled steel is commercially obtainable at a cost less than that of the cold drawn product.

Other objects and advantages will be apparent during the course of the following description.

In the accompanying drawings forming a part of this application and in which like numerals are employed to designate like parts throughout the same, Figure 1 is a fragmentary side elevation of a polygonal bar in association with the means for grooving and partly severing the bar and then completely severing the nut blanks from the bar, the bar working means being shown conventionally, Figure 2 is a fragmentary side elevation disclosing a hexagonal bar grooved only at the corners thereof and in association with the grooving and severing means, the grooving and severing means being shown conventionally, Figure 3 is a central vertical sectional view through a nut blank after being severed from the bar, the view illustrating the circularly milled chamfers around the terminal portions of the nut blank, Figure 4 is a central vertical sectional view through the nut blank after being subjected to an extruding and indenting operation, Figure 5 is a central vertical sectional view through the nut blank after being punched to form the bore of the nut, Figure 6 is a central vertical sectional view through the nut blank after being countersunk at the ends thereof and fixed as to height, Figure 7 is a central vertical sectional view through the nut blank after being broached to remove surplus metal from the bore of the nut blank, Figure 8 is a central vertical sectional view through the nut blank in association with the indenting and extruding means, Figure 9 is a central vertical sectional view through the nut blank, the view illustrating the means by which the nut is punched to form the bore thereof, Figure 10 is a central vertical sectional view through the nut blank in association with the countersinking and height correcting means, Figure 11 is a central vertical sectional view through the nut blank in association with the broaching means by which surplus metal is removed from the bore of the nut, Figure 12 is a central vertical sectional view through the nut blank in association with the knock-out means, Figure 13 is a perspective of a completed double chamfered nut, Figure 14 is a perspective of a nut chamfered only at one end thereof, Figure 15 is a longitudinal sectional view through a single chamfered nut, the view illustrating the added tensile strength of the thread bearing portion of the nut.

In the drawings, the numeral 20 designates a hexagonal bar of metal carried by a support 22 and subjected to the successive action of milling and shearing mediums 24 and 26, respectively.

It is clearly illustrated in Figure 1 that the bar is milled circumferentially and endlessly to form opposed chamfers 28 and at the same time to partly sever the bar in preparation for the presentation of the bar to the shearing element or medium 26. That is to say, the cutting element 24 forms endless circumferential grooves in the bar 20, such grooves being more or less V-shaped in cross-section and extending through and entirely across all flat faces of the bar to weaken the bar in preparation for severing and at the same time to cut or mill chamfers 28 extending entirely around the bar without interruption or break. These constitute the chamfered ends of the completed nut.

With the bar thus partly severed and thus weakened, the same is presented to the severing medium 26, of any suitable character, and by which the nut blanks are individually removed from the bar.

The art shows a wide variety of means for circumferentially grooving bars so that no detailed illustration of a particular grooving means will be found in this application. By the same token, the art discloses numerous ways in which sections or blanks may be severed from a polygonal or other bar, for which reason I have not attempted to disclose the particular mounting or actuating means for the member 26; the mediums 24 and 26 being shown conventionally.

The effect of the action of the mediums 24 and 26 is to produce individual nut blanks 30 of hexagonal form having chamfers milled around the terminals of all flat faces thereof and extending circularly about the axis of the blank, it being observed that the chamfers were produced in preparation for and as a mere incident to the severing operation by which the nut blank was detached from the bar. By reason of the cutting of the circular chamfers in preparation for and as a mere incident to the severing operation, no part of the cost of producing the nut is chargeable to the severing operation alone. That is to say, the cutting of circular chamfers at the ends of the nut blanks involves no extra cost.

If desired, a hexagonal bar 40 may be circumferentially nicked or grooved only at the corners thereof as indicated at 42, this being accomplished by the milling or cutting medium 46 that is advanced to a point where it engages only the corner portions of the bar. The effect of the action of the member 46 is to weaken the bar at longitudinally spaced points and to mill circumferentially spaced chamfers about the axis of the bar. In other words, nicking of the bar 40 as indicated at 42, produces milled chamfers in all faces of the bar and particularly at the corners of the bar while the central portions of the flats of the bar and of the completed nut blanks are unchamfered.

In carrying out the form of invention shown in Figure 2, the previously nicked bar is presented to the intermittent action of a severing medium 48 in the nature of a shear blade or other member having the power to detach the foremost nut blank 50 from the bar.

Continuing with the description of the newly severed nut blank 30, attention is invited to Figure 8 in which it is illustrated that the nut blank is placed in a female die 54 of hexagonal or other polygonal form and is subjected from opposite ends thereof to the action of indenting and extruding dies 56, these dies having somewhat spherical blank contacting portions to indent the blank from opposite ends thereof and extrude the metal into firm pressure engagement with the flat side walls of the surrounding die 54. This operation is accompanied by full opportunity for the free flow and escape of metal. This is true because the opposite ends of the nut blank at the circularly chamfered portions thereof are entirely free, being unrestrained by either the die 54 or the adjacent portions of the elements 56, it being noted that the portions of the elements 56 adjacent to and beyond the ends of the nut blank are tapered and are constantly spaced from the circularly milled chamfers 28. One effect of the indenting and extruding operation disclosed in Figure 8 is to establish a firm pressure contact of the nut blank with the surrounding walls of the die 54. In this way, the newly made recesses or indentations in the nut blank are properly centered for the succeeding punching and other operations.

Of course, the action of the opposed elements 56 produces a radial and to some extent axial flow of metal, leaving but a rather thin intervening web 60. Following the indenting and extruding operation disclosed in Figure 8, the nut blank is subjected to the action of a rough punching die 66 by which the web 60 is removed to form the bore of the nut blank. The nut blank is punched axially of the grain of the metal so that the completed nut will have the grain running axially thereof.

Since the web 60 is relatively thin and occupies but a minor portion of the original blank, the waste incident to the punching operation is negligible and, as brought out in the opening paragraphs of the specification, this loss together with the very small waste in cuttings due to the milling of the chamfers around the nut, aggregate but a negligible part of the material used.

The indenting and extruding operation shown in Figure 8 results in a nut blank having the greatest density, and consequently hardness, at the longitudinally central portion thereof, with such hardness tapering or gradually diminishing radially outward. To be sure, the entire nut body is compressed to some extent due to the back pressure by the retaining die but the major compression is confined to the thread bearing portion, leaving the peripheral portion of the nut relatively soft and tough.

Following the punching operation illustrated in Figure 9, the nut blank, with its newly formed bore, is presented to the action of a pair of oppositely located dies 70 which move into pressure engagement with the nut blank from opposite ends thereof. These dies 70 are reduced at the terminal portions thereof to form truncated cones 74 which move into the bore of the nut to countersink the same. The countersinking portions 74 are surrounded by shoulders which engage opposite ends of the nut and thereby give to the nut the required height, it being observed in this latter connection that as an incident to the indenting and extruding operation disclosed in Figure 8, the nut blank may be increased in axial dimension to a point beyond the allowed tolerance.

It is clearly illustrated in Figure 10 that a constant minimum space is provided between the opposed ends of the countersinking elements 74. This space is available for the free inward flow of metal under the axial pressure of the dies 70. In this manner, there is allowed full opportunity for the escape of metal to protect against excessive work hardening and over-pressures.

Attention is now invited to Figure 11 in which it is illustrated that following the operation disclosed in Figure 10, the nut blank is subjected to the action of a broaching tool 80 which moves through the bore of the nut and cuts or shaves out the surplus material which may have constricted the bore as an incident to the countersinking of the nut blank and its correction for height. That is to say, the broaching operation disclosed in Figure 11 may be a finishing one in preparation for threading, and following the broaching operation, the nut blank may be removed from the die by a knock-out punch 90.

By confining the several axial swaging pressures to the longitudinally central or inner portion of the blank and allowing of the free flow of metal, I am thus enabled to hold the circular and double chamfers that were so economically cut as a mere incident to the severing operation and at the same time to work harden the material where such hardness is of the greatest value. The major flow of metal during the various swaging operations occurs at points removed from the circular chamfers and this, of course, assists in holding these chamfers. Although the double chamfers are left free to permit of the easy flow of metal, such flow is not reflected in distortion or mutilation of these chamfers. This is true because before the flow of metal reaches the chamfers it has been reduced to the vanishing point or nearly so.

By confining the axial swaging pressures to the inner or longitudinally central portion of the blank, the vastly greater bulk of surrounding metal, constituting the peripheral portion of the blank, is enabled to absorb the displaced metal with a minimum of strain on the blank. In a word, but a minor part of the nut blank is subjected to direct axial swaging pressure in a particular operation while the major portion of the blank is left free for the flow of metal.

It is illustrated in Figure 7 that by reason of confining the swaging and other axial deforming pressures to the longitudinal central portion of the blank, the central or inner portion of the blank will be denser than the peripheral portion of the nut or that portion of the nut material between and in longitudinal alignment with the chamfers. By this arrangement, the wrench engaging portions of the nut are allowed to retain practically their entire original toughness and tenacity as distinguished from being brittle. For example, prior to the various compressing and swaging operations, the reading on the "B" scale Rockwell shows 85 in the core of the blank and 93 at the corners. After the compressing and swaging operations, the "B" scale reading is 102 at the core of the blank and only 95 at the corners.

As suggested in the opening paragraphs of the specification, the invention contemplates the use of hot rolled steel, without the intervention of cold drawing, and in this way I am able to avail myself of the lower cost of the hot rolled product as distinguished from cold drawn steel. At the same time, I enjoy the advantage of working with hot rolled steel with its superior ductility and workability. That is to say, the hot rolled product is softer and tougher than cold drawn steel and hence is not only more responsive to the cutting tools shown in Figure 1, but to the various swaging, punching, and broaching mediums disclosed in Figures 8 to 11, inclusive.

In addition, the finished nut, in being made from hot rolled steel, has the tenacity characteristic of that metal, while the cold drawing of steel has the effect of work hardening the metal, particularly at the surface thereof.

By starting with a hexagonal or other bar having approximately the cross-sectional outline of the finished nut, I am enabled to avoid violent swaging operations to give the nut its final form. For example, many nuts are made from initially round bars and are subjected to a number of more or less violent swaging operations to give to the nut the required hexagonal or other polygonal form, all of which operations have the effect of work hardening the material and rendering it brittle to the point where it is seriously strained.

My invention calls for but several mild individual swaging operations in which the redistribution of metal is slight and in which there is allowed full opportunity for the escape of metal so as to avoid excessive work hardening although at the same time causing sufficient work hardening to give to the nut the required strength.

The mild nature of the several swaging operations employed by me is effective in bringing about the required minor redistribution of the metal and this, together with the use of an initially polygonal bar, avoids the need of severe or violent swaging operations known to impair the integrity of the metal. The total deformation of metal necessary for the practise of this invention is much less than in any other punching method of which I know and this, together with the fact that such deformation is accomplished by mild swaging, the initial toughness and tenacity of the metal is preserved which leads to the statement that while the invention enjoys the economy of the punching and swaging operations, it avoids the disadvantages or undesirable features of swaging and results in the production of a nut in which the much desired differential in the matter of hardness is achieved as a mere incident to manufacture.

It will be seen that the invention contemplates a combination of milling and punching steps, but since the milling operation to produce the single or double chamfers is performed as a mere incident to severing the blank from a bar, no additional steps or expense will be found to be involved due to the milling of the chamfers, for which reason a nut constructed in accordance with this invention approximates the time cost of a punched nut, while the cost of material is decidedly lower than that employed for the manufacture of punched nuts. In addition, actual tests show that nuts embodying this invention are 28 per cent stronger than bar milled nuts and 23 per cent stronger than nuts made on machines calling for a combination of punching and swaging operations.

Having thus described the invention what is claimed is:

1. The herein described method of producing polygonal metallic nut blanks which comprises milling circular chamfers at both ends of the metallic nut blank and across all side faces thereof, subjecting the nut blank to a plurality of axial swaging and punching operations that are confined to the longitudinally central portion of the metal constituting the blank thereby leaving the said milled chamfers and the metal between such chamfers free of direct axial pressure incident to the axial swaging operations.

2. The herein described method of producing polygonal nut blanks of metal which comprises providing a polygonal nut blank of metal with a circular chamfer at one end thereof and across all side faces thereof; subjecting the nut blank at the longitudinally central portion thereof to a plurality of axial swaging and working operations while protecting the said chamfer and the metal of the nut blank in longitudinal alignment therewith against direct axial deforming pressures throughout the said swaging and working operations.

3. The herein described method of producing hexagonal nut blanks from hexagonal bars of metal which comprises circularly milling a chamfer around one end of the nut blank; subjecting the longitudinally central portion of the nut blank at a point radially inward of said circular chamfer to an indenting and extruding operation to recess the blank and cause a flow of metal from the central to the surrounding portion of the blank; and then axially punching the nut blank where it was previously indented and at a point radially inward of said circularly milled chamfer to form a bore therein, and leaving the milled chamfer of the blank free of direct axial swaging pressures.

4. The herein described method of producing hexagonal nut blanks from hexagonal bars of metal which comprises circularly milling a chamfer around one end of the nut blank and across all side faces thereof; subjecting the longitudinally central portion of the nut blank at a point radially inward of said circular chamfer to an indenting and extruding operation to recess the blank and cause a flow of metal from the central to the surrounding portion of the blank; punching the nut blank axially where it was previously indented and at a point radially inward of said circularly milled chamfer to form a bore therein; and then axially swaging the nut blank at a point immediately surrounding the bore thereof and at a point radially inward of the peripheral portion of the hexagonal nut blank and leaving the peripheral portion of the blank free of axial swaging pressures during manufacture.

5. The herein described method of producing nut blanks which comprises circularly milling one terminal of a nut blank to form a circularly milled chamfer thereon; subjecting the blank to a plurality of successive axial swaging and punching operations at points removed from said circularly milled chamfer and leaving full opportunity for the flow of metal to preserve the said circularly milled chamfer throughout the said successive swaging and punching operations.

6. The herein described method of producing polygonal nut blanks which comprises milling a nut blank with a chamfer encircling the longitudinal axis of the nut blank; punching the blank axially thereof to form the bore of the nut blank; and then subjecting the previously punched blank to an axial swaging pressure at a point removed from circularly milled chamfer to cause a flow of metal in toward the bore of the nut blank.

7. The herein described method of producing nut blanks which comprises severing nut blanks from bars of hot rolled steel and circularly milling the nut blanks about the longitudinal axis of the nut blanks to form a circularly milled chamfer as an incident to the severing operation; indenting and axially swaging the nut blank at the central portion thereof and at points removed from said circularly milled chamfer to maintain the circularly milled chamfer; punching the nut at a point radially inward of the said circularly milled chamfer to form the bore of the nut; and countersinking the blank and subjecting the same to an axial pressure inwardly of the chamfer to cause a flow of metal in toward the bore of the nut blank.

8. The herein described method of producing a nut blank which comprises severing a nut blank from a bar of hot rolled steel and circularly milling the nut blank about the longitudinal axis thereof to form a circularly milled chamfer as an incident to the severing operation; axially indenting and swaging the nut blank at the central portion thereof and at points removed from said circularly milled chamfer to maintain the circularly milled chamfer; punching the blank at a point radially inward of the said circularly milled chamfer to form the bore of the nut; countersinking the blank and subjecting the same at the central portion only to an axial pressure to cause a flow of metal in toward the bore of the nut blank, and then broaching the bore of the nut blank.

9. The herein described method of producing double chamfered polygonal nut blanks from a polygonal bar of metal which comprises circularly milling the bar to define a partly severed nut blank having the opposite end portions thereof formed with circularly milled chamfers; severing from the bar the blank thus formed indenting the central portions of the nut blank from opposite ends thereof and swaging the blank inward of and in spaced relation to the said circularly milled chamfers to maintain the integrity of the chamfers; punching the nut blank axially where the same was indented, further subjecting the nut blank to axial swaging at a point removed from said chamfers to cause a flow of metal in toward the bore of the nut blank and in a direction generally away from the said circularly milled chamfers to countersink the nut blank at opposite ends thereof and to fix the height thereof, and then broaching the bore of the blank.

10. In a punched nut, a polygonal body of hot rolled steel having a central bore running axially of the grain of the steel, said body being formed at the outer peripheral portion thereof with a circular chamfer, the hot rolled steel in the region of the bore being materially denser than the hot rolled steel constituting the peripheral portion of the nut blank, that portion of the nut blank in longitudinal alignment with said chamfer being possessed of substantially its original toughness.

11. The herein described method of producing nuts from hot drawn polygonal bars of steel which comprises circumferentially milling the corner portions only of the bar at longitudinally spaced points so as to divide the bar into a plurality of initially united blanks and to form milled chamfers only at the corner portions of the blank; severing from the bar the blanks thus formed; subjecting the blanks to a plurality of axial swaging, punching and forming operations at points radially inward of and spaced from said chamfers milled at the corner portions of the blanks to increase the density of the metal at the longitudinally central portion of the blanks and to leave the surrounding portion of the blanks possessed of the original density thereof.

12. The herein described method of producing a nut blank which comprises severing a nut blank from a bar of metal and milling a chamfer around the outer peripheral portion thereof to form a circularly milled chamfer as an incident to the severing operation; axially indenting and swaging the nut blank at the central portion thereof and at points removed from said chamfer to maintain the integrity of the chamfer; punching the blank at a point radially inward of the chamfer to form the bore of the nut; subjecting the blank at the central portion only to an axial pressure to cause a flow of metal in toward the bore to constrict such bore, and then passing a tool through the bore to give the bore the required diameter.

13. The herein described method of producing polygonal nut blanks from polygonal bars of metal which comprises severing the nut blanks from the bar; subjecting the longitudinal central portion of the nut blank at a point radially inward of the periphery of the blank to an indenting and extruding operation to recess the blank and cause a flow of metal from the central to the surrounding portion of the blank; and then axially punching the nut blank where it was previously indented and at a point radially inward of the periphery of the blank to leave the peripheral portion of the blank free of direct axial pressures.

14. The herein described method of producing polygonal nut blanks which comprises severing a blank from a polygonal bar of metal; directly subjecting the blank to axial swaging and punching operations and restricting and confining the direct axial pressure incident to each of these operations to the portion of the blank spaced radially inward of the outer periphery of the blank so as to increase the density of the metal of the thread-bearing portion of the blank while at the same time maintaining substantially the original density of the metal of the peripheral portion of the blank by allowing free axial flow of the metal of the blank throughout the axial swaging and punching operations.

15. The herein described method of producing polygonal nut blanks from hot rolled steel which comprises milling a chamfer on one end of a blank of metal of an initially polygonal cross section, subjecting the blank to an axial cold pressing operation confined to the portion of the blank spaced radially inward of the milled chamfer to harden the metal thereof and so as to preserve the milled chamfer and leave the metal in longitudinal alignment therewith possessed of substantially its original characteristics, and punching the blank at a point radially inward of the milled chamfer to form a bore therein.

16. In a nut, a body formed of metal having substantially the characteristics of hot rolled steel, an outer peripheral chamfer at one end of said body provided by a milling operation, said body also being formed with a bore, the metal immediately surrounding said bore being of greater density than the metal in longitudinal alignment with said chamfer, the greater density of the metal immediately surrounding said bore being provided by axial swaging and punching operations confined to the longitudinally central portion of the body so that the density of the metal in longitudinal alignment with said chamfer will remain substantially unaltered.

17. A nut comprising a body formed of hot rolled steel, said body having a centrally arranged threaded bore, the thread-bearing portion of said body being compacted and materially hardened so that the metal forming the thread-bearing portion is increased in density, the outer portion of said nut being possessed of substantially its original characteristics.

18. A nut comprising a body formed of hot rolled steel having a centrally arranged threaded bore, the thread-bearing portion of said body being compacted and hardened through axial pressure confined to the longitudinally central portion of the body whereby the outer portion of said body remains substantially unaltered and possessed of substantially its original characteristics.

19. The herein described method of producing polygonal nut blanks which comprises milling a chamfer on one end of a metallic blank of an initially polygonal cross-section, subjecting the blank to an axial cold pressing operation confined to the portion of the blank spaced radially inward of the milled chamfer to increase the density of the metal thereof and so as to preserve the milled chamfer and leave the metal in longitudinal alignment therewith possessed of substantially its original density, and punching the blank at a point radially inward of the milled chamfer to form a bore therein.

20. The herein described method of producing chamfered polygonal nut blanks from a polygonal bar of metal which comprises circularly milling the bar to define a partly severed nut blank having one end portion thereof formed with a circularly milled chamfer; severing from the bar the blank thus formed; subjecting the blank to an axial cold pressing operation confined to the portion of the blank spaced radially inward of the milled chamfer to increase the density of the metal thereof and so as to preserve the milled chamfer and leave the metal in longitudinal alignment therewith possessed of substantially its original density, and punching the blank at a point radially inward of the milled chamfer to form a bore therein.

21. The herein described method of producing double chamfered polygonal nut blanks from a polygonal bar of metal which comprises circularly milling the bar at spaced points to define a partly severed nut blank having the opposite end portions thereof formed with circularly milled chamfers; severing from the bar the blank thus formed; subjecting the blank to an axial cold pressing operation confined to the portion of the blank spaced radially inward of the milled chamfers to increase the density of the metal thereof and so as to preserve the milled chamfers and leave the metal in longitudinal alignment therewith possessed of substantially its original characteristics, and punching the blank at a point radially inward of the milled chamfers to form a bore therein.

22. A nut comprising a metallic body having an outer peripheral chamfer at one end thereof provided by a milling operation, said body being formed with a bore, the metal in the region of said bore being of greater density than the metal in longitudinal alignment with said chamfer, the greater density of the metal in the region of said bore being provided by an axial cold pressing operation confined to the longitudinally central portion of the body whereby the density of the metal in longitudinal alignment with said chamfer will remain substantially unaltered.

ALBERT STOLL.